United States Patent
Mielenz et al.

(10) Patent No.: US 10,459,438 B2
(45) Date of Patent: Oct. 29, 2019

(54) METHOD AND DEVICE FOR OPERATING A PARKING SPACE

(71) Applicant: Robert Bosch GmbH, Stuttgart (DE)

(72) Inventors: Holger Mielenz, Ostfildern (DE); Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/547,967

(22) PCT Filed: Jan. 22, 2016

(86) PCT No.: PCT/EP2016/051324
§ 371 (c)(1),
(2) Date: Aug. 1, 2017

(87) PCT Pub. No.: WO2016/128201
PCT Pub. Date: Aug. 18, 2016

(65) Prior Publication Data
US 2018/0024548 A1    Jan. 25, 2018

(30) Foreign Application Priority Data
Feb. 12, 2015    (DE) .................. 10 2015 202 471

(51) Int. Cl.
*G05D 1/00* (2006.01)
*H04W 4/029* (2018.01)
*B60W 30/06* (2006.01)
*G05D 1/02* (2006.01)
*G08G 1/0968* (2006.01)
*H04W 4/00* (2018.01)
*H04W 8/00* (2009.01)
*G08G 1/14* (2006.01)
(Continued)

(52) U.S. Cl.
CPC ........... *G05D 1/0022* (2013.01); *B60W 30/06* (2013.01); *G01C 21/3685* (2013.01);
(Continued)

(58) Field of Classification Search
None
See application file for complete search history.

(56) References Cited

U.S. PATENT DOCUMENTS 6,594,580 B1    7/2003    Tada et al.
2001/0019309 A1    9/2001    Saeki et al.
(Continued)

FOREIGN PATENT DOCUMENTS

DE    10033727 A1    1/2002
DE    60202168 T2    12/2005
(Continued)

OTHER PUBLICATIONS

Machine translation of JP2003069485.*
International Search Report for PCT/EP2016/051324, dated Apr. 21, 2016.

*Primary Examiner* — Rami Khatib
(74) *Attorney, Agent, or Firm* — Norton Rose Fulbright US LLP; Gerard Messina

(57) ABSTRACT

A method for operating a parking facility within which several base stations are disposed, a) a minimum data quantity of data needed by a vehicle for its journey in the parking facility being ascertained so that the vehicle, based on the data corresponding to the minimum data quantity, can leave a radio range of a first base station and drive into radio range of a second base station, b) the first base station transmitting the ascertained minimum data quantity of data to the vehicle located within radio range of the first base station so that the vehicle, based on the data, can leave the radio range of the first base station and drive into radio range of the second base station. The invention further relates to a
(Continued)

corresponding apparatus, to a corresponding parking system, and to a computer readable medium having a computer program.

14 Claims, 2 Drawing Sheets

(51) Int. Cl.
| | | |
|---|---|---|
| G01C 21/36 | (2006.01) | |
| H04L 29/06 | (2006.01) | |
| H04W 4/44 | (2018.01) | |
| H04W 4/021 | (2018.01) | |
| H04L 29/08 | (2006.01) | |
| H04W 4/04 | (2009.01) | |

(52) U.S. Cl.
CPC ............ *G05D 1/028* (2013.01); *G05D 1/0223* (2013.01); *G08G 1/096822* (2013.01); *G08G 1/096844* (2013.01); *G08G 1/146* (2013.01); *H04L 63/00* (2013.01); *H04W 4/00* (2013.01); *H04W 4/029* (2018.02); *H04W 8/00* (2013.01); *G05D 2201/0213* (2013.01); *H04L 67/12* (2013.01); *H04W 4/021* (2013.01); *H04W 4/046* (2013.01); *H04W 4/44* (2018.02)

(56) References Cited

U.S. PATENT DOCUMENTS

| | | | | |
|---|---|---|---|---|
| 2002/0029108 | A1* | 3/2002 | Liu ..................... | G01C 21/26 701/410 |
| 2002/0036571 | A1* | 3/2002 | Takahashi ............... | G08G 1/09 340/901 |
| 2008/0136674 | A1* | 6/2008 | Jang ..................... | G08G 1/017 340/932.2 |
| 2011/0125344 | A1* | 5/2011 | An ..................... | G05D 1/0242 701/2 |
| 2011/0130894 | A1* | 6/2011 | Kim ..................... | G05D 1/0282 701/2 |
| 2014/0207369 | A1 | 7/2014 | Yuasa | |

FOREIGN PATENT DOCUMENTS

| | | |
|---|---|---|
| DE | 102004032346 A1 | 1/2006 |
| DE | 60027099 T2 | 11/2006 |
| DE | 69931126 T2 | 4/2007 |
| DE | 102010033215 A1 | 2/2012 |
| DE | 102012222562 A1 | 6/2014 |
| FR | 2539888 A1 | 7/1984 |
| JP | 2002271258 A | 9/2002 |
| JP | 2003069485 A | 3/2003 |
| JP | 2005010060 A | 1/2005 |
| JP | 2008061037 A | 3/2008 |
| JP | 2011055547 A | 3/2011 |

* cited by examiner

METHOD AND DEVICE FOR OPERATING A PARKING SPACE

FIELD OF THE INVENTION

The present invention relates to a method and an apparatus for operating a parking facility. The invention further relates to a parking system for vehicles, and to a computer program.

BACKGROUND INFORMATION

Published Application DE 10 2012 222 562 A1 presents a system for managed parking areas, for conveying a vehicle from a starting position to a destination position.

In fully automatic (autonomous) "valet parking," a vehicle is parked by its driver at a dropoff location, for example in front of a parking structure, and from there the vehicle drives itself into a parking position or parking bay and back again to the dropoff location.

For valet parking, a plurality of information items, i.e. a plurality of data, must as a rule be transferred to the vehicle. It can be disadvantageous that the vehicle can be expected to wait for a long time in the entry region of the parking facility for transfer of all the information needed in order to reach the parking position.

SUMMARY OF THE INVENTION

An object on which the invention is based can be regarded as that of furnishing an efficient concept for operating a parking facility which allows waiting times of vehicles at a parking facility, for the purpose of information transfer, to be shortened.

This object may be achieved by way of the respective subject matter of the independent claims. Advantageous embodiments of the invention are the subject matter of respective dependent claims.

According to one aspect, a method for operating a parking facility within which several base stations are disposed is furnished,
a) a minimum data quantity of data needed by a vehicle for its journey in the parking facility being ascertained in such a way that the vehicle, based on the data corresponding to the minimum data quantity, can leave a radio range of a first base station and drive into radio range of a second base station,
b) the first base station transmitting the ascertained minimum data quantity of data to the vehicle located within radio range of the first base station so that the vehicle, based on the data, can leave the radio range of the first base station and drive into radio range of the second base station.

According to a further aspect, an apparatus for operating a parking facility within which several base stations are disposed is furnished, encompassing:
  a processor that is embodied to ascertain a minimum data quantity of data needed by a vehicle for its journey in the parking facility in such a way that the vehicle, based on the data corresponding to the minimum data quantity, can leave a radio range of a first base station and drive into radio range of a second base station, and
  a control device for controlling the first base station in such a way that the first base station transmits the ascertained minimum data quantity of data to the vehicle located within radio range of the first base station so that the vehicle, based on the data, can leave the radio range of the first base station and drive into radio range of the second base station.

According to another aspect a parking system for vehicles is furnished, which system encompasses a parking facility within which several base stations are disposed, the parking system further encompassing the apparatus for operating a parking facility.

In accordance with yet another aspect a computer program is furnished, which program encompasses program code for carrying out the method for operating a parking facility when the computer program is executed on a computer.

The invention therefore encompasses, in particular and inter alia, the idea of making available to the vehicle only as much data as the vehicle needs for a journey from the first to the second base station. This therefore means that, in particular, the amount of data that must be transmitted to the vehicle is only enough to allow the vehicle to drive into radio range of the second base station. The reason is that the vehicle can obtain or receive further data from the second base station so that it can then continue its journey in the parking facility based on those data.

This therefore means in particular that the vehicle's residence time within radio range of the first base station can be shortened, as compared with the situation in which the vehicle already has all the data completely transferred to it when it is within radio range of the first base station, all that data being needed for the vehicle's entire journey in the parking facility. If the first base station is disposed in an entry region of the parking facility, a residence time of the vehicle in the entry region can thus advantageously be shortened. A throughput rate of vehicles that can pass through the entry region can thereby advantageously be increased.

A "base station" for purposes of the present invention refers in particular to a so-called "access point," which can also be referred to as a "wireless access point." An access point or base station of this kind refers in particular to an electronic device that functions as an interface for wireless communication devices. Terminal devices, in particular terminal devices that are installed, for example, in a vehicle, create in particular a wireless communication connection to the base station.

This therefore means that, for example, a terminal device is integrated into the vehicle. In particular, the vehicle encompasses such a terminal device. By way of the terminal device the vehicle creates, for example, a communication connection to a base station.

A "parking facility" for purposes of the present invention can also be referred to as a "parking area," and serves as an area for parking vehicles. The parking facility thus constitutes in particular a continuous area that encompasses several parking locations (in the context of a parking facility on private property) or parking spaces (in the context of a parking facility on public property). According to an embodiment, the parking facility can be encompassed by a parking structure. In particular, the parking facility is encompassed by a garage.

According to an embodiment, communication (i.e. in particular the transmission and/or reception of data) is carried out via a communication network.

According to an embodiment, the communication network encompasses a WLAN network and/or a mobile radio network.

In an embodiment, a communication via the communication network respectively becomes or is encoded.

According to an embodiment, provision is made that a vehicle speed of the vehicle is adapted in such a way that the vehicle remains within radio range of the first base station until the data have been completely transmitted to the vehicle.

This brings about in particular the technical advantage of effectively ensuring that the vehicle remains within radio range of the first base station until the data needed by the vehicle for its journey to the second base station, more accurately in order to reach the radio range of the second base station, have been completely transmitted to the vehicle. Adaptation of the vehicle speed is a particularly simple measure in this context, which can be carried out in simple fashion.

Adaptation of the vehicle speed of the vehicle encompasses in particular the fact that remote-control data are transmitted to the vehicle, based on which data the vehicle is guided in remote-controlled fashion, so that the vehicle speed is adapted based on those remote-control data. Adaptation of the vehicle speed encompasses in particular the fact that a target vehicle speed is transmitted to the vehicle, so that the vehicle regulates its instantaneous vehicle speed, in particular autonomously, to the target vehicle speed.

Adaptation of the vehicle speed encompasses in particular the fact that the vehicle speed is reduced. The "vehicle speed" refers in particular to the instantaneous vehicle speed. The vehicle will therefore, in particular, drive more slowly in accordance with the adaptation than before the adaptation.

According to an embodiment, provision is made that an estimate is made, in response to reception of a report from the vehicle as to the magnitude of the data quantity already received by the vehicle, as to how much time is needed until the data are completely transmitted from the first base station to the vehicle, so that the vehicle speed is adapted based on the estimated time.

This brings about in particular the technical advantage that it is possible to estimate efficiently how much time is still needed for transmission to the vehicle of all the data that the vehicle needs for its journey until it reaches the radio range of the second base station. The vehicle speed can then correspondingly be efficiently adapted. The reason is that based on the report of the vehicle, the amount of data the vehicle has already received is known. An improved estimate of the aforementioned time is thus thereby enabled.

In another embodiment, provision is made that the estimate is carried out based on a transmitted power level of the first base station, which is ascertained based on a digital transmitted power level map that indicates the magnitude of a respective transmitted power level of the base stations, and/or based on an instantaneous data transfer rate between the first base station and the second base station.

This brings about in particular the technical advantage that an efficient adaptation of the vehicle is enabled, inasmuch as an accurate estimate of the aforementioned time is enabled. This is because if an instantaneous data transfer rate is known, it is then possible as a rule to estimate fairly accurately how much time is still needed in order to transfer the remaining data. The time still needed can be ascertained in particular based on the transmitted power level map, i.e. based on the transmitted power level of the first base station, since as a rule it is the case that the higher a transmitted power level, the more quickly data can be transferred.

In another embodiment, provision is made that the minimum data quantity is ascertained based on a respective transmitted power level of the first and the second base station, the respective transmitted power levels being ascertained based on a digital transmitted power level map that indicates the magnitude of a respective transmitted power level of the base stations.

This brings about in particular the technical advantage that the minimum data quantity to be ascertained can be ascertained efficiently. The reason is that because the magnitude of the transmitted power level is known, it is possible to estimate efficiently when the vehicle will come into radio range of the second base station. Because the magnitude of the transmitted power level of the first base station is also known, it is possible to estimate efficiently how long the vehicle will remain within radio range of the first base station, and/or the location in the parking facility at which it will leave the radio range of the first base station. It is thus possible thereby to estimate particularly effectively the minimum amount of data that must be made available to the vehicle so that it can still reach the radio range of the second base station.

According to an embodiment, provision is made that a digital transmitted power level map, which indicates the magnitude of a respective transmitted power level of the base stations, is updated in response to reception of a received power level measured by the vehicle, and/or of a data transfer rate measured by the vehicle.

This brings about in particular the technical advantage that continuously updated transmitted power levels for individual base stations are available to the digital transmitted power level map. It is thereby possible in particular to prevent the minimum data quantity from being ascertained based on outdated, and possibly no longer valid, values for transmitted power levels. It is thus possible to ensure thereby that the minimum data quantity is ascertained accurately.

According to an embodiment, a digital transmitted power level map, which indicates the magnitude of a respective transmitted power level of the base stations, is provided.

According to an embodiment, provision is made that the steps a) and b) recited above are carried out iteratively for further base stations, so that the vehicle can leave a radio range of one base station and drive into radio range of a further base station based on the data that a base station has transmitted to the vehicle, until the vehicle has reached a destination position in the parking facility.

This therefore means in particular that the steps recited previously and hereinafter in conjunction with the first and the second base station can also be continued for further base stations. This therefore means that, for example, after the second base station the vehicle can drive to a third and from there to a fourth and optionally to a fifth and optionally to a sixth, and so forth, analogously to a journey from the first base station to the second. This therefore means in particular that when the vehicle is within radio range of the second base station, it receives a minimum quantity of data that the vehicle needs in order to leave the radio range of the second base station and arrive within radio range of the third base station. Provision is then made in particular that when the vehicle is located within radio range of the third base station, the vehicle is provided with a minimum quantity of data needed by the vehicle in order to arrive within radio range of a fourth base station. This can be continued arbitrarily until the vehicle has reached its destination position in the parking facility.

This therefore means in particular that an idea of the present invention is to be seen in the fact that the vehicle does not have provided to it, already at the beginning of its journey in the parking facility to the destination position, all the data necessary for that journey. Instead, provision is made according to the present invention that the data needed for the journey in the parking facility to the destination position is made available to the vehicle in segments. "In segments" means here in particular that, in particular, only data for an immediately upcoming segment, i.e. for example from a first to a second base station or from a second to the third base station, are made available to the vehicle.

A "destination position" in the parking facility refers in particular to a position to which the vehicle is intended to drive. A destination position is, for example, a parking position in the parking facility at which the vehicle is intended to park.

A journey of the vehicle to the destination position begins in particular from a starting position. A starting position is, for example, a dropoff position of the parking facility at which a driver can drop off his or her vehicle.

A starting position is, for example, a parking position at which a vehicle is parked. In this case the destination position is, in particular, a pickup position at which a driver of the vehicle can pick up his or her vehicle.

According to an embodiment, the pickup position and the dropoff position are identical.

In another embodiment the pickup position and the dropoff position are different.

The pickup position is disposed in particular in an exit region of the parking facility. The dropoff position is disposed in particular in an entrance region of the parking facility. The entrance region and exit region of the parking facility can in particular overlap.

According to an embodiment, provision is made that the journey of the vehicle in the parking facility is an autonomous journey of the vehicle. This therefore means that based on the data, the vehicle drives autonomously in the parking facility, i.e. in particular autonomously from the first base station into radio range of the second base station.

According to an embodiment, provision is made that the journey of the vehicle in the parking facility is a remotely controlled journey. This therefore means in particular that the vehicle is guided in remotely controlled fashion. This therefore means that the vehicle is guided in remotely controlled fashion from the first base station into radio range of the second base station.

According to an embodiment, provision is made that the journey of the vehicle in the parking facility encompasses both a remotely controlled journey and an autonomous journey. This therefore means that the vehicle, for example, drives one segment autonomously and is guided over a further segment in remotely controlled fashion. Any combinations are, in particular, possible here.

According to an embodiment, provision is made that the vehicle parks autonomously or in remotely controlled fashion in or at the parking position.

According to an embodiment, provision is made that the vehicle exits the parking position autonomously or in remotely controlled fashion.

According to an embodiment, provision is made that the vehicle is guided autonomously and/or in remotely controlled fashion from a starting position to a destination position in the parking facility. In particular, provision is made according to an embodiment that the vehicle autonomously drives, and/or is guided in remotely controlled fashion, from the destination position back to the starting position.

"Autonomously" means for purposes of the present invention, in particular, that the vehicle navigates or drives in the parking facility independently, i.e. without intervention of a driver. The vehicle thus drives independently in the parking facility with no need for a driver to control the vehicle for that purpose. Such driving encompasses, in particular, open- or closed-loop control of transverse and/or longitudinal guidance of the vehicle. An autonomously driving vehicle of this kind which can automatically enter and exit a parking space is referred to, for example, as an "automatic valet parking" vehicle or "AVP" vehicle. Vehicles that do not exhibit this AVP functionality are referred to, for example, as "ordinary" vehicles.

According to an embodiment, provision is made that data needed by the vehicle for its journey in the parking facility from a starting position to a destination position are ascertained, the data of the minimum data quantity being ascertained based on the ascertained data.

This therefore means in particular that all the necessary data are in fact already ascertained at the beginning of the vehicle's journey in the parking facility. Of those data, however, only the data that the vehicle needs for its journey from the first to the second base station are transmitted to the vehicle. A residence time of the vehicle within radio range of the first base station can thereby, in particular, be shortened.

According to a further embodiment, provision is made that of those data already ascertained in advance, the data made available to the vehicle are the data that it then respectively needs for its journey from the second to the third base station, and from the third to the fourth, and so on.

In another embodiment, provision is made that the data encompass one or more elements of the following group of data: trajectory data, map data of a digital map of the parking facility, remote-control data, object data of movable and/or stationary objects present in the parking facility, landmark data, traffic data, and hazard data.

This therefore means in particular that the trajectory data specify to the vehicle a target trajectory that it is intended to travel on its journey. Based on the map data of the digital map of the parking facility the vehicle can, for example, advantageously orient itself within the parking facility and/or navigate in the parking facility based on those map data. Remote control of the vehicle is made possible, in particular, based on the remote-control data. Remote-control data thus encompass, for example, remote-control commands. Object data of movable and/or stationary objects present in the parking facility encompass, in particular, position data of those objects. This therefore means that the object data specify which objects are located in the parking facility, and where. Provision is made in particular that object data for movable objects also encompass speed data, so that an instantaneous speed of those objects is known.

A "stationary object" refers in particular to an object that cannot move. A stationary object is, for example, a fixed infrastructure such as, for example, a column in the parking structure. A "movable object" refers in particular to an object that can move, even if it is not currently moving. A parked or stopped vehicle is, for example, a movable object, since it can in fact move. A "movable object" therefore refers in particular to further vehicles and/or persons and/or animals in the parking facility.

Landmark data encompass, in particular, a position of the landmark or of several landmarks, and/or a landmark type of the landmark(s), and/or in particular the content of the landmark(s). Landmark data are used in particular by vehicles and can be needed, for example, in order to drive autonomously in the parking facility. The content of a landmark encompasses, for example, one or more shapes that can be recovered by way of an environmental sensor suite, in particular by way of visual sensors, for example by way of the vehicle. A content encompasses, for example: a barcode and/or a specific shape of an infrastructure (for example, an assemblage of columns having specific dimensions and spacings), and/or a specific shape (for example, a statue). A content of a landmark is therefore, in particular, something that, including its position, is known (e.g. stored in a digital map) and is located in the real world. A landmark is therefore used, for example, to recognize and/or analyze where the vehicle is located. A landmark is thus, for example, a recognition point.

Traffic data encompass, for example, a position of a traffic sign or of several traffic signs, and a traffic type of the traffic sign or signs. Traffic data are encompassed, for example, by map data of a digital map but do not need to be such.

Hazard data encompass a position of a hazardous region or several hazardous regions in the parking facility, and a nature or type of the hazard of the hazardous region or regions. A hazardous region is, for example, a region in the parking facility within which a vehicle, in particular an AVP vehicle, has problems, for example because sensor-based environmental sensing in that region is difficult.

According to an embodiment, provision is made that the apparatus for operating a parking facility is configured or embodied to execute or carry out the method for operating a parking facility.

The statements made in conjunction with the method apply analogously to the apparatus and to the parking system, and vice versa. This therefore means in particular that the technical features and technical functionalities that arise in the context of the apparatus also apply to the method, and vice versa. This therefore means, for example, that the processor is embodied to ascertain the minimum data quantity in accordance with the statements made previously and/or in accordance with the statements made hereinafter.

According to an embodiment, the control device is configured to control the second base station and/or further base stations. This therefore means that the control device can control the second base station in such a way that the second base station transmits, to the vehicle present within radio range of the second base station, an ascertained minimum data quantity of data that the vehicle needs for its journey to a third base station. This minimum data quantity has previously been ascertained by the processor in accordance with the statements made previously and hereinafter. This also applies to further base stations. This therefore means that the vehicle can be guided to a destination position by way of the apparatus, the data necessary therefor being made available in segments to the vehicle. The control device is configured in particular to control the base stations.

The invention will be explained in further detail below with reference to the exemplifying embodiments.

Identical reference characters can be used hereinafter for identical features.

DETAILED DESCRIPTION

Figure 1:
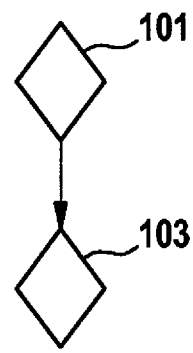
FIG. 1 is a flow chart of a method for operating a parking facility.

FIG. 1 is a flow chart of a method for operating a parking facility within which several base stations are disposed.

According to a step 101 a minimum data quantity of data needed by a vehicle for its journey in the parking facility is ascertained in such a way that the vehicle, based on the data corresponding to the minimum data quantity, can leave a radio range of a first base station and drive into radio range of a second base station. In a step 103, provision is made that the first base station transmits the ascertained minimum data quantity of data to the vehicle present within radio range of the first base station, so that the vehicle, based on the data, can leave the radio range of the first base station and drive into radio range of the second base station.

Figure 2:
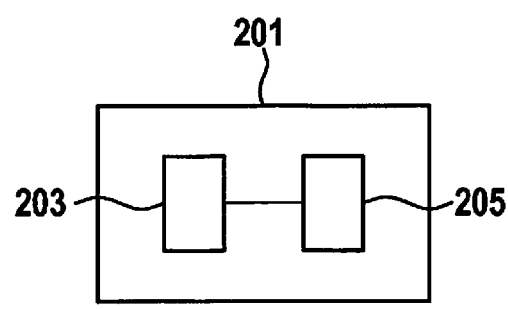
FIG. 2 shows an apparatus for operating a parking facility.

FIG. 2 shows an apparatus 201 for operating a parking facility within which several base stations are disposed.

Apparatus 201 encompasses a processor 203 that is embodied to ascertain a minimum data quantity of data needed by a vehicle for its journey in the parking facility, in such a way that the vehicle, based on the data corresponding to the minimum data quantity, can leave a radio range of a first base station and drive into radio range of a second base station.

Apparatus 201 further encompasses a control device 205 for controlling the first base station in such a way that the first base station transmits the ascertained minimum data quantity of data to the vehicle present within radio range of the first base station, so that the vehicle, based on the data, can leave the radio range of the first base station and drive into radio range of the second base station.

The control device is embodied in particular to control the several base stations in accordance with the statements made previously and/or hereinafter so that they transmit corresponding minimum data quantities to the vehicle when the latter is within their radio range.

Figure 3:
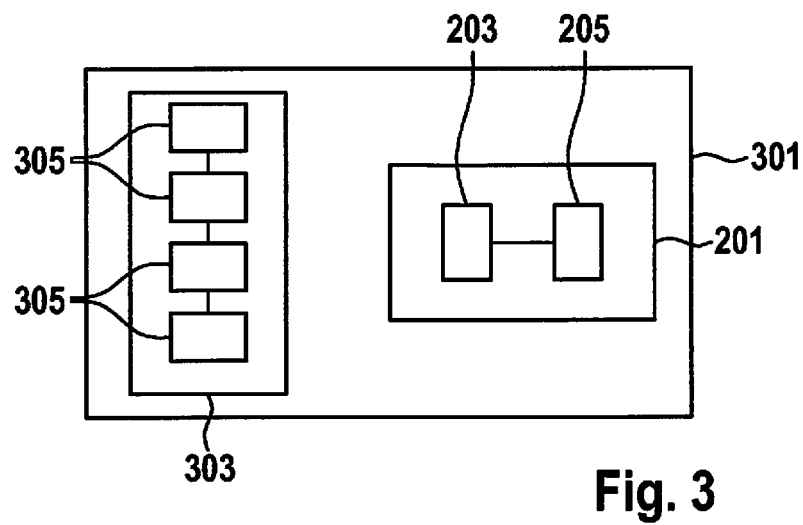
FIG. 3 shows a parking system for vehicles.

FIG. 3 shows a parking system 301 for vehicles.
Parking system 301 encompasses apparatus 201 of FIG. 2. Parking system 301 further encompasses a parking facility 303 within which several base stations 305 are disposed.

Figure 4:
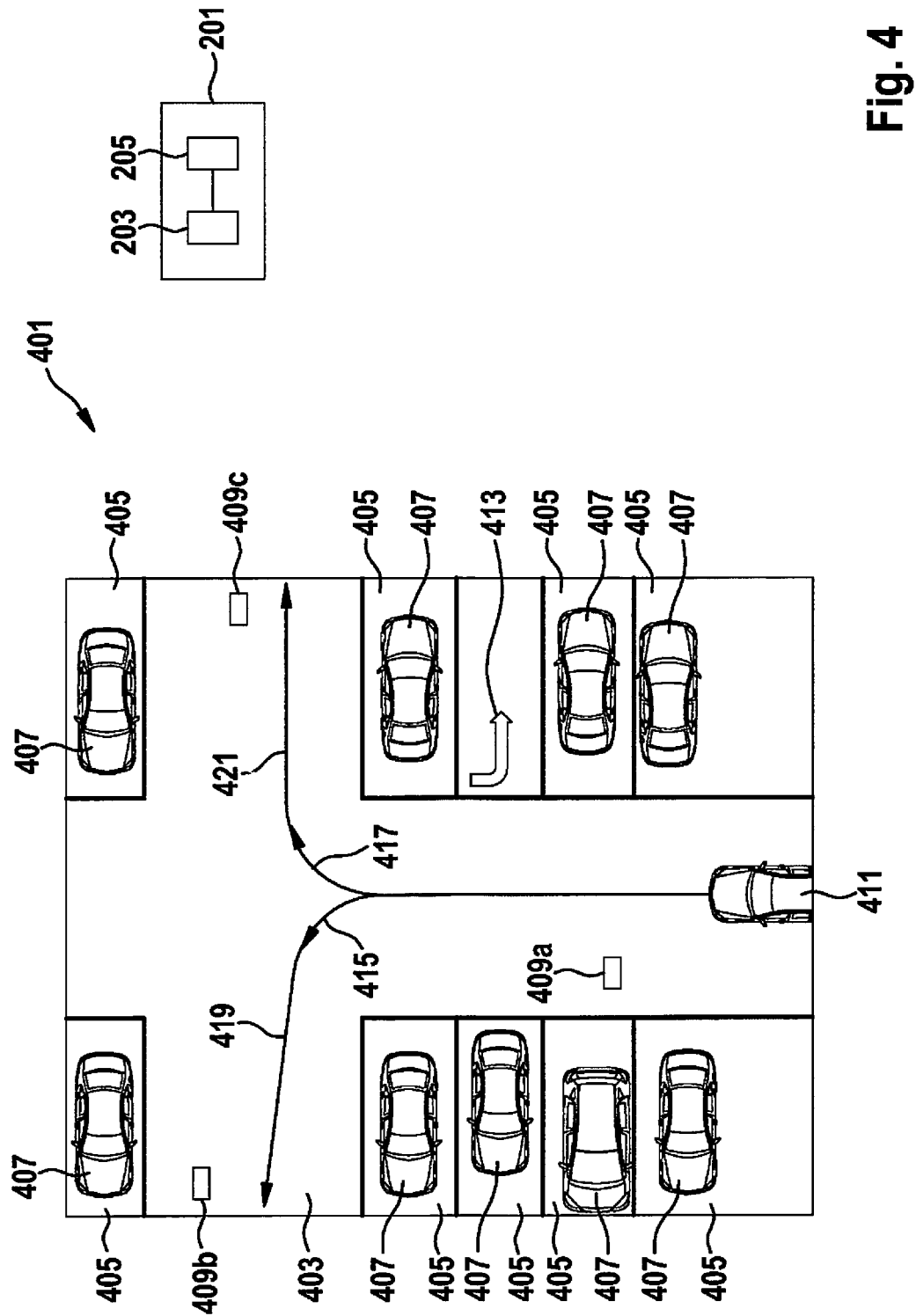
FIG. 4 shows a further parking system for vehicles.

FIG. 4 shows a further parking system 401 for vehicles.
Parking system 401 encompasses apparatus 201 of FIG. 2. Parking system 401 further encompasses a parking facility 403, FIG. 4 showing by way of example a portion of parking facility 403. Parking facility 403 encompasses several parking positions 405. Vehicles 407 that are parked at parking positions 405 are drawn in by way of example.

Parking facility 403 encompasses by way of example three base stations 409*a*, 409*b*, and 409*c*. Be it noted that the number of base stations shown here is merely an example. In further embodiments, more or fewer than three base stations are provided.

The reference character 411 indicates a vehicle that is driving within parking facility 403. Vehicle 411 is located within radio range of base station 409*a*, which will be referred to hereinafter as a "first base station."

The reference character 413 indicates a directional arrow that is drawn on the roadway, that directional arrow 413 defining a driving direction in parking facility 403.

As long as vehicle 411 is within radio range of base station 409*a*, data that the vehicle needs for its journey in parking facility 403 are transferred to vehicle 411 by the fact that base station 409*a* transmits those data to vehicle 411. Base station 409*a* transmits to vehicle 411, however, only as much data as vehicle 411 needs for a journey to within radio range of base station 409*b* or of base station 409*c*, depending on a destination position of vehicle 411 in parking facility 403.

Those data encompass, for example, trajectory data of a trajectory 415 if the vehicle is intended to drive into radio range of base station 409*b*. Those data encompass, for example, trajectory of a trajectory 417 if the vehicle is intended to drive into radio range of base station 409c. Those data encompass, for example, landmark data and/or traffic data and/or hazard data.

As soon as the vehicle has arrived respectively within radio range of base station 409b or base station 409c, the corresponding base station can then transmit further data to vehicle 411. The two base stations 409b, 409c can thus be referred to as a "second base station."

The data that are then transmitted respectively from base station 409b or 409c to vehicle 411 encompass, for example, trajectory data of a respective trajectory 419 or 421 that the vehicle is intended to follow on its journey to the destination position in parking facility 403.

The respective corresponding base station 409b or 409c then transmits to vehicle 411 only as much data as vehicle 411 needs for a journey from the respective corresponding base station 409b or 409c to a third base station, i.e. until the vehicle arrives within radio range of the third base station. This can be continued, in particular iteratively, until the vehicle has then ultimately reached its destination position.

This therefore means in particular that once a destination position in the parking facility has been specified for vehicle 411, only a first portion (respectively trajectory 415 or trajectory 417) of a total trajectory (from a starting position to the destination position) is conveyed to the vehicle from first transmission station 409a, which trajectory brings vehicle 411 just into the region of sufficiently high transmission strength (i.e. within radio range) of the respective corresponding base station 409b or 409c. When vehicle 411 has then reached the transmission region, i.e. radio range, of the corresponding base station 409b, 409c, the process continues iteratively in the same manner. This means that the corresponding base station 409b,c transmits to vehicle 411 a second portion (trajectory 419 or 421) of the total trajectory.

Vehicle 411 is, for example, an AVP vehicle.

The invention therefore encompasses, in particular and inter alia, the idea of operating an automated valet parking system with an increased throughput rate thanks to segment-wise transmission of trajectories and/or further parking-facility data (for example, parking-structure data) from the apparatus, which can be encompassed e.g. by a parking-facility server, in particular a parking-structure server, to the vehicle, which is e.g. an AVP vehicle. This results advantageously, in particular in the entry region, in a shortening of an initial transfer phase and thus in a reduction in waiting times and in a reduction, associated therewith, in the risk of a long backup in the event of a high arrival rate of vehicles, in particular AVP vehicles.

A central idea of the present invention is, in particular, segment-wise transmission of the necessary information. An important factor for this is, in particular, a bandwidth existing at the present moment for transferring information (data transfer rate) from the base station to the vehicle, and respectively in consideration of further base stations in the parking facility, which can be referred to, for example, as a "parking system," and in consideration of the trajectory to be traveled by the vehicle.

In particular, according to an embodiment provision can be made to perform an adaptation of the vehicle speed as a function of the expected bandwidth and of the information yet to be transferred, so that the information relevant to the vehicle can be transferred within the range of sufficient transmission strength of a base station.

This therefore means in particular that the information needed by the vehicle for its journey in the parking facility is transferred segment-wise to the vehicle in such a way that the vehicle obtains sufficient information (for example, a trajectory and/or a digital map having, for example, landmarks and a destination position) to arrive at a region of a higher transfer rate of a subsequent access point, with the result that residence times in an entry region of the parking facility can be reduced and a throughput rate can thus be increased.

According to an embodiment, provision is thus made that a destination position, for example a parking position, is selected, for example, by a parking structure management system that, for example, can encompass the apparatus. In particular, according to an embodiment, a trajectory for reaching it is planned. According to an embodiment, for example, the trajectory is partitioned, by way of an existing digital map of the parking facility which provides information as to how the transmitted power level of each access point in the parking system behaves, in such a way that what is transferred from the current access point is only that trajectory which guides the vehicle into reception and transmission range of the next access point on the trajectory that is to be traveled. This procedure is carried out iteratively, in particular until the destination position is reached.

In particular, according to an embodiment provision is made that the vehicle measures a currently existing received power level and data rate and transfers them to the apparatus, which can then, in particular on the basis thereof, optimize, i.e. update, the transmitted power map.

According to an embodiment, provision is made to regulate or adapt a speed of the vehicle by way of the information yet to be transferred within a reception range of an access point. Provision is made in this context, in particular, that the vehicle is, for example, informed as to the data volume (minimum data quantity) that is thus to be transferred within the current access point. The vehicle can then, in particular, advantageously ascertain the data quantity that has already been received. An estimate is then made in particular, by way of the transmitted power map and/or the current data rate, of the time still required for complete transfer of the data. If the result of the current speed would be that at the data rate thus detected, the information cannot be completely transferred by the time the vehicle has left the radio range of the base station, the speed of the vehicle is reduced to the value such that the vehicle remains within radio range of the first base station until the data have been completely transferred.

Advantages of the present invention are in particular a reduction in waiting times in an entry region of the parking facility, and an increase in vehicle throughput rates.

In addition, a number of access points can be reduced by the fact that a speed of a vehicle is adapted to the information yet to be transferred and to a current available data rate, so that all the information to be transferred within an access point reaches the AVP vehicle. This means in particular that the vehicle, during its journey, receives the information in prospective fashion from the server, i.e. for example from the apparatus, and drives more slowly when the distance from the access point is greater (and the data rate is thus lower).

What is claimed is:

1. A method for operating a parking facility within which several base stations are disposed, the method comprising:
   a first of the base stations operating at a power level by which the first base station has a first radio range within which transmissions by the first base station are able to reach a vehicle;

identifying the first radio range;
identifying a second radio range, which is a radio range within which transmissions of a second one of the base stations are able to reach the vehicle;
based on the identified first and second radio ranges, identifying an area of the parking facility that is external to each of, and is, in a traveling direction of the vehicle, between, the first and second radio ranges;
based on the identified area, ascertaining data for guiding the vehicle in the identified area; and
performing a transmission, by the first base station, based on which the vehicle is controlled to remain within the first radio range until the ascertained data, which is transmitted in the transmission, is received by the vehicle from the first base station.

2. The method of claim 1, wherein a vehicle speed of the vehicle is adapted so that the vehicle remains within the first radio range until completion of the transmission of the ascertained data to the vehicle.

3. The method of claim 2, further comprising, in response to reception of a report from the vehicle as to a magnitude of a data quantity already received by the vehicle, estimating an amount of time that is needed until the completion of the transmission of the ascertained data from the first base station to the vehicle, so that the vehicle speed is adapted based on the estimated amount of time.

4. The method of claim 3, wherein the estimating is carried out based on a transmission power level of the first base station, which is ascertained based on a digital transmission power level map that indicates a magnitude of respective transmission power levels of the base stations.

5. The method of claim 3, wherein the estimating is carried out based on a transmitted power level of the first base station, which is ascertained based on an instantaneous data transfer rate from the first base station.

6. The method of claim 1, wherein the ascertainment of the first and second radio ranges is based on respective transmission power levels of the first and second base stations, and wherein the respective transmission power levels are ascertained based on a digital transmission power level map that indicates respective magnitudes of the respective transmission power levels of the first and second base stations.

7. The method of claim 1, wherein a digital transmission power level map, which indicates respective magnitudes of respective transmission power levels of the first and second base stations, is updated in response to reception of a received power level measured by the vehicle.

8. The method of claim 1, wherein the ascertaining and transmission performing tasks are carried out iteratively for each of a plurality of further base stations with respect to a respective area between a respective radio range of the respective further base station and a further respective radio range of another base station.

9. The method of claim 1, further comprising ascertaining data for guiding the vehicle in the parking facility from a starting position to a destination position, wherein the data for guiding the vehicle in the area between the first and second radio ranges is a subset of the data for guiding the vehicle from the starting position to the destination position.

10. The method of claim 1, wherein the data includes one or more of the following: trajectory data, map data of a digital map of the parking facility, remote-control data, object data of movable objects present in the parking facility, object data of stationary objects present in the parking facility, landmark data, traffic data, and hazard data.

11. The method of claim 1, wherein a digital transmission power level map, which indicates respective magnitudes of respective transmission power levels of the first and second base stations, is updated in response to reception of an indication of a data transfer rate measured by the vehicle.

12. An apparatus for operating a parking facility within which several base stations are disposed, comprising:
a processor of a first one of the base stations that is operating at a power level by which the first base station has a first radio range within which transmissions by the first base station are able to reach a vehicle; and
a communications interface of the first base station;
wherein the processor is configured to:
identify the first radio range;
identify a second radio range, which is a radio range within which transmissions of a second one of the base stations are able to reach the vehicle;
based on the identified first and second radio ranges, identify an area of the parking facility that is external to each of, and is, in a traveling direction of the vehicle, between, the first and second radio ranges;
based on the identified area, ascertain data for guiding the vehicle in the identified area; and
perform a transmission, by the first base station via the communications interface, based on which the vehicle is controlled to remain within the first radio range until the ascertained data, which is transmitted in the transmission, is received by the vehicle from the first base station.

13. A non-transitory computer readable medium on which are stored instructions that are executable by a processor of a first one of a plurality of base stations arranged in a parking facility and that, when executed by the processor, causes the processor to perform a method, the first base station operating at a power level by which the first base station has a first radio range within which transmissions by the first base station are able to reach a vehicle, the method comprising:
identifying the first radio range;
identifying a second radio range, which is a radio range within which transmissions of a second one of the base stations are able to reach the vehicle;
based on the identified first and second radio ranges, identifying an area of the parking facility that is external to each of, and is, in a traveling direction of the vehicle, between, the first and second radio ranges;
based on the identified area, ascertaining data for guiding the vehicle in the identified area; and
performing a transmission, by the first base station, based on which the vehicle is controlled to remain within the first radio range until the ascertained data, which is transmitted in the transmission, is received by the vehicle from the first base station.

14. A parking facility comprising:
a first base station including a processor and operating at a respective power level by which the first base station has a first radio range within which transmissions by the first base station are able to reach a vehicle; and
a second base station operating at a respective power level by which the second base station has a second radio range within which transmissions by the second base station are able to reach the vehicle;
wherein the processor of the first base station is configured to:
identify the first and second radio ranges;
based on the identified first and second radio ranges, identify an area of the parking facility that is external to each of, and is, in a traveling direction of the vehicle, between, the first and second radio ranges;

based on the identified area, ascertain data for guiding the vehicle in the identified area; and perform a transmission, by the first base station, based on which the vehicle is controlled to remain within the first radio range until the ascertained data, which is transmitted in the transmission, is received by the vehicle from the first base station.

* * * * *